Aug. 8, 1950 J. H. FRIEDMAN 2,518,433
RING SHEARING MACHINE
Filed March 20, 1946
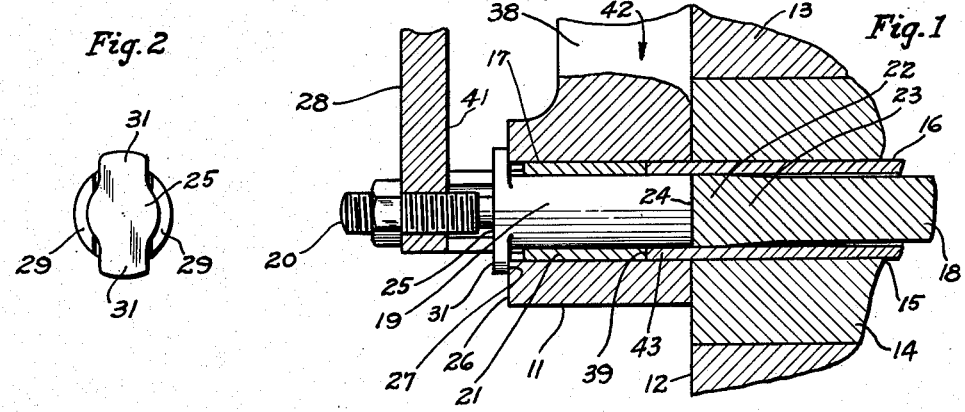
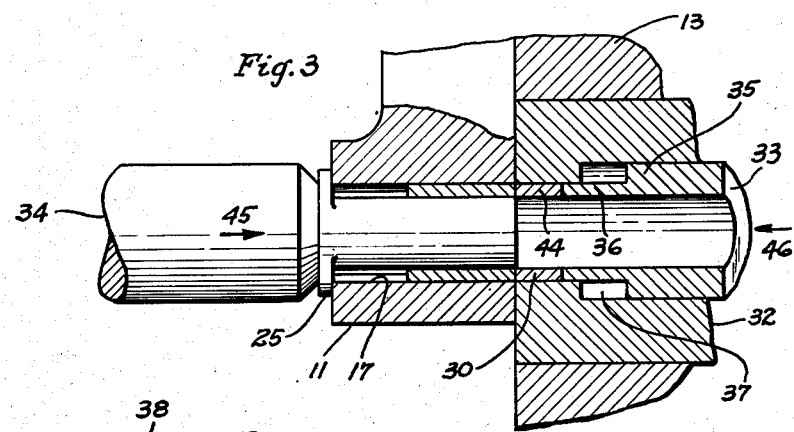
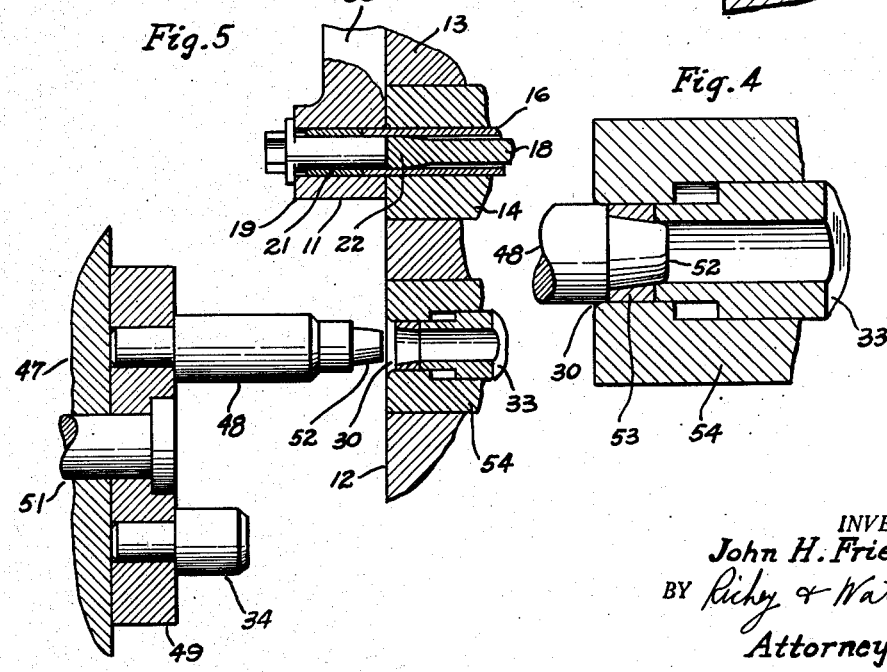
INVENTOR.
John H. Friedman
BY Richey & Watts
Attorneys Patented Aug. 8, 1950

2,518,433

UNITED STATES PATENT OFFICE 2,518,433

RING SHEARING MACHINE

John H. Friedman, Tiffin, Ohio, assignor to The National Machinery Company, Tiffin, Ohio, a corporation of Ohio Application March 20, 1946, Serial No. 655,735

4 Claims. (Cl. 164—47)

My invention relates to forming methods and apparatus and concerns particularly the formation of annular or ring-shaped pieces of metal or other material.

It is an object of my invention to provide improved rapid and accurate methods and apparatus for forming hollow pieces and rings.

Still another object of my invention is to form rings or hollow pieces by shearing blanks from tubing.

Still another object of my invention is to form either annular or other hollow pieces by shearing blanks from tubing and performing an additional working operation upon the blanks before discharging or ejecting them so as to provide upsets, tapered cross-sections, or the like, with a high degree of rapidity.

Other and further objects, features and advantages of the invention will become apparent as the description proceeds:

In carrying out my invention in accordance with a preferred form thereof, I provide a die plate having a stock feeding aperture and a kick-out or knock-out aperture; and I provide a cutter in the form of a shear bush adapted to slide along the surface of the die plate for receiving an end portion of tubular stock cutting it off and transferring it to the kick-out aperture. Cooperating therewith, I provide means for either performing any desired working operation upon the blank in the kick-out aperture or merely clearing the shear bush of the cut blank. Means are provided for kicking out the blank or the finished piece from the kick-out aperture after the shear bush has retracted. In order to preserve the shape and edges of the blank and the tubular stock, mandrels are provided both in the stock feeding aperture and in the shear bush or cutter with edges terminating along the surface of the die plate whereby the cutter mandrel may travel with the shear bush during the cutting operation.

In addition, a stripping sleeve serving also for gauging the length of tubular blank cut-off is carried in the shear bush concentric with the cutter mandrel and the bore in the shear bush.

A better understanding of the invention will be afforded by the following detailed description considered in conjunction with the accompanying drawing.

Fig. 1 is a sectional fragmentary view of apparatus which may be employed for carrying out my invention in accordance with an embodiment thereof, the section being illustrated as cut by a plane in the axis of the mandrels in the stock feeding aperture and the gauge or cutter mandrel in the shear bush.

Fig. 2 is an end view of the cutter mandrel and the stripping sleeve illustrated in the shear bush of the apparatus of Fig. 1.

Fig. 3 is a fragmentary view, primarily in cross-section, corresponding to Fig. 1 representing a section cut by a plane passing through the axis of the kick-out aperture.

Fig. 4 is a view corresponding to Fig. 3 illustrating an arrangement employed for performing a working operation upon the cut blank such as upsetting to produce a tapered bore in the blank.

Fig. 5 is a fragmentary sectional assembly view of apparatus employed for cutting blanks from tubular stock and upsetting them to produce tapered longitudinal medial sections therein with squared end surfaces.

Like reference characters are utilized throughout the drawing to designate like parts.

In my co-pending application, Serial No. 586,001, filed March 31, 1945, I have shown methods and apparatus for shearing blanks or slugs from bar stock by means of a cutter or shear bush reciprocating along the surface of a die plate or the die breast of a cold header. As illustrated in Fig. 1 of the drawing of my present application, I may employ a similar cutter or shear bush 11 adapted to slide along the surface 12 of a fragmentarily represented die plate 13 containing a cut-off quill 14 having an aperture 15 therein through which stock may be fed. In carrying out my present invention, however, I am not concerned with the feeding of bar stock but the feed of tubular stock 16 in order that ring-shaped or hollow cylindrical blanks may be cut off. For the purpose of preserving the circular shape of the blanks as well as the tubular stock 16 and preserving reasonably squared cut off ends, means are provided for supporting the inner tubular or hollow cylindrical surfaces as well as the outer surfaces of the tubular stock. Accordingly, the diameter of the aperture 15 in the cut-off quill 14 and the diameter of the bore 17 of the cutter is made just enough greater than the average maximum diameter of stock 16 to assure sufficiently free feed of the stock. For supporting the inner surface of the stock in the quill 14, a round floating mandrel 18 is provided. For supporting the inner surface of the portion of the stock which is to be cut off to form the ring-shaped blank, a moving cutter mandrel or gauge mandrel 19 is provided which is carried within the bore 17 of the cutter 11.

For gauging the length of blank cut-off and facilitating the clearing of the cut-off blank from the shear bush 11 after the shearing operation has been completed a stripper sleeve 21 is provided which is also carried in the bore 17 of the cutter 11 concentric with and between the mandrel 19 and the bore 17.

In order to guard against the possibility of the stock mandrel 18 binding in the tubular stock 16 or causing excessive friction in the feeding of the stock 16 in the event of lack of straightness of the tubular stock 16, the mandrel 18 preferably has only an end portion 22 which is of the full desired diameter for properly supporting the inner surface of the stock 16. The principal portion of the floating mandrel or stock mandrel 18 is of slightly reduced diameter and there is a tapering portion 23 between the end portion 22 and the main or stem portion of the mandrel 18. The right hand end portion of the stock mandrel 18 has been broken away for greater clarity of the drawing, but, it will be understood that the mandrel 18 need not be the full length of the tubular stock being fed and may, for example, have a length such as approximately eight or ten times the diameter of the tubular stock, it being sufficient that the length be enough to hold the mandrel 18 approximately coaxial with the bore of the tubing 16 so as to avoid binding of the full diameter portion 22.

The mandrels 18 and 19 are formed with relatively accurate abutting surfaces perpendicular to their axes in order that they may lie in close continuous contact along a common surface 24 lying within the plane 12 of the die breast or die plate surface. Preferably the cutter mandrel 19 is formed with a T-head 25 adapted to rest against the outer surface 26 of the cutter 11 and the axial length of the gauge mandrel 19 between the inner surface 27 of the T-head 25 and the end surface 24 is made equal to the thickness measured in axial direction of the cutter 11 so that the end surface 24 of the mandrel 19 will lie in the surface 12 of the die plate.

For holding the cutter mandrel 19 in the bore 17 of the cutter 11 a limit gauge pin 20 is mounted in a stock gauge 28. Preferably the limit pin 20 is threaded or otherwise adjustably mounted in the stock gauge 28 in order to allow for adjustment of the position of a stock gauge 28 when it is desired to change the length of blank to be cut by the apparatus.

The stripping sleeve 21 is preferably bifurcated so as to provide two symmetrical portions 29, illustrated in Fig. 2, as straddling the transverse arms or wings 31 of the T-head 25 of the mandrel 19. The projecting bifurcated portions 29 are made of sufficient length to allow for ejection of the cut blank from the bore 17 by striking the ends of the bifurcated portions 29.

As illustrated in Fig. 3, another portion of the die plate 13 is provided with an ejecting, knockout or kick-out aperture 30 preferably formed in a die or insert 32 in the plate 13. A kick-out sleeve 33, or in some cases, if desired, a solid kickout rod is provided which is slideable in the kickout aperture 30 for ejecting blanks from the kickout aperture 30. Where no additional work other than squaring up the ends is to be performed upon the cut blank, a punch or header tool 34 is provided which is carried by a header slide, not shown in Fig. 3, adapted to travel in the direction of the axis of the kick-out aperture 30. For increasing the sturdiness of the apparatus, the kick-out sleeve 33 preferably has an enlarged diameter portion 35 backing the thinner end portion 36 which corresponds in thickness to the thickness of the tubular stock being worked upon. In this case, the die or insert 32 has an enlarged diameter portion 37 corresponding to the portion 35 of the kick-out sleeve 33.

When it is desired to cut rings from tubular stock and to perform no other operation thereon or merely to square the ends, this may be accomplished in a conventional header by a single blow of the header slide and a single reciprocation of the cutter 11. It is to be understood that the cutter 11 is moved along the surface 12 of the die plate 13 by its shank 38 driven by a cross-arm, cam or other suitable conventional means, not illustrated. The tubular stock 16, the end portion of which has been broken away for simplicity of the drawing, is fed into the aperture 15 by any suitable means such as manually or as by gripping rollers, not shown, until the end 39 of the stock rests against the corresponding end surface of the stripper sleeve 21, and the bifurcated end 29 of the reciprocating stripper sleeve 21 is driven against the surface 41 of the stock gauge 28. The friction between the inner surface of the stock 16 and the outer surface of the full diameter portion 22 of the floating stock mandrel 18 serves to move the stock mandrel 18 into abutment with the end surface 24 of the cutter mandrel 19. The T-head 25 of the mandrel 19 is held against the surface 26 of the cutter 11 by the gauge pin 20.

The cutter 11 is thereupon driven along the surface 12 of the die plate 13 in the direction of the arrow 42 thereby shearing off the end portion 43 of the tubular stock 16 to form a blank 44, illustrated in Fig. 3. After the cutter 11 has moved to the position illustrated in Fig. 3, wherein its bore 17 is coaxial with the kick-out aperture 30, the punch 34 is caused to move toward the die plate 13 in the direction of the arrow 45 thereby striking the bifurcated ends 29 of the stripper sleeve 21 and forcing the cut-off-blank 24 into the kick-out aperture 30. The stroke of the punch 34 is made such that the end surface 39 of the kick-out or stripper sleeve 21 is brought into the front surface plane 12 of the die plate 13. Preferably the projecting length of the bifurcated portions 29 of a stripper sleeve 21 beyond the outer surface of the T-head 25 of the gauge mandrel 19 is made equal to the desired length of the blank to be cut off so that the punch 34 may drive against the T-head 25 whereupon its stroke is positively arrested by contact between the parts 25, 11 and 13. If it is desired to cut longer or shorter blanks, a stripper sleeve is substituted in which the projecting bifurcated portion 29 is longer or shorter and the main cylindrical portion is correspondingly shorter or longer.

Assuming no operation other than the original shearing operation is to be performed upon the blank 44, the punch 34 is then retracted and the cutter 11 is also retracted to its original position, illustrated in Fig. 1 ready to have an additional length of stock fed into it. As soon as the cutter 11 has retracted from the position of Fig. 3, the blank 44 may be ejected by motion of the kickout sleeve 33 to the left in the direction of the arrow 46. The kick-out motion of the sleeve 33 may be accomplished in any desired conventional manner by means of a spring stressed by the stroke of the punch 34 or by a cam or a pitman mechanism, not shown. Where it is desired to square up the ends of the blank 44, the kick-out sleeve 33 is made of relatively sturdy construction as illustrated and a suitable limit support is provided for holding the kick-out sleeve 33 in the position illustrated in Fig. 3 so that the stroke of the punch 34 not only, ejects the blank 44 from the bore 17 of the cutter 11, but, also drives the end surface 39 of the stripper sleeve 21 with such force against the end of the blank 44 as to cause a slight flow of metal sufficient to square the end surfaces of the blank 44 abutting the stripper sleeve 21 and the kick-out sleeve 36.

If it is desired to change the shape of the longitudinal medial section of the blank 44, this is accomplished by providing a suitable punch such as shown in Fig. 4, for example, illustrating an arrangement for producing a tapered inner surface in the blank 44 in a single blow of a punch after the blank 44 has been transferred from the stock feeding position of Fig. 1 to the kick-out position of Fig. 3. In this case, two strokes of the header slide are provided—one for ejecting the blank 44 from the cutter 11 and the other for performing the desired operation. As represented schematically in Fig. 5, a header slide 47 is provided carrying two punches 34 and 48 adapted to be brought into position alternately along the axis of the kick-out aperture 30. For example, the punches 34 and 48 may be carried on a plate 49, swiveled on a pivot 51 or a transfer arrangement similar to that illustrated in Patent 1,932,396 Clouse, may be provided. The punch 48 has a tapered end 52 of the required shape for producing the desired upset or other working upon the blank 44 to convert it to the form 53, illustrated in Fig. 4. It will be understood that the axial displacements of the ends of the knock out punch 34 and the blank-forming punch 48 from the plate 49 are such that the same length of stroke of the header slide serves to cause the knock-out punch 34 to drive the blank 44 out of the bore 17 of the cutter 11 into the die block 54 against the kick-out sleeve 33 and later to perform the desired work upon the blank 44 when the punch 48 is brought into the original position of the knock-out punch 34. The punch 48 drives the blank 44 further into the aperture 30 against the kick-out sleeve 33 to complete the form of the finished piece 53. If further forming operations are desired, additional stations and punches may be provided.

If desired, means may be provided for removing both the cutter mandrel 19 and the stripper sleeve 21 from the bore 17 of the cutter 11 through the left-hand end thereof as the cutter 11 transfers the blank 44 from the position of the stock feed aperture 15 to the position of the knock-out aperture 30 or the die aperture as the case may be. In this case, the parts 19 and 21 may be made integral in the axial relationship illustrated in Fig. 1 and the punch 48 may be arranged to drive through the bore 17 of the cutter 11 when the latter is opposite the knock-out or die aperture 30.

I have herein shown and particularly described certain embodiments of my invention and certain methods of operation embraced therein for the purpose of explaining its principle of operation and showing its application but it will be obvious to those skilled in the art that many modifications and variations are possible and I aim, therefore, to cover all such modifications and variations as fall within the scope of my invention which is defined in the appended claims.

I claim:

1. A ring shearing machine, comprising in combination a die plate having a stock-feeding aperture and a knock-out aperture, a mandrel within the stock-feeding aperture adapted to ride within tubular stock fed through said stock-feeding aperture, said mandrel being shorter than the stock and having an inner end portion of a diameter to snugly fit within the stock with the remainder of the mandrel being of reduced section to clear the stock, a shear-bush slideable along the surface of the die plate, a stripper sleeve and a cutter mandrel concentrically carried with said shear-bush, means for locating the cutter mandrel with its inner end in alignment with the said die surface and locating the stripper sleeve with its inner end spaced from said surface a distance equalling the desired axial length of rings to be sheared, and a heading tool in alignment with the knock-out aperture for driving said stripper sleeve toward said surface and driving the sheared ring into said knock-out aperture for clearing the shear bush thereof.

2. A ring shearing machine comprising in combination a die plate having a cut-off quill mounted therein to form a stock feeding aperture, the plate and quill having front surfaces in the same plane, a mandrel within the stock feeding aperture adapted to ride within tubular stock fed through said stock feeding aperture, said mandrel being shorter than the stock and having an inner end portion of a diameter to snugly fit within the stock with the remainder of the mandrel being of reduced section to clear the stock, a shear bush slideable along the surface of the die plate, a stripper sleeve and a cutter mandrel concentrically carried within said shear bush, means for locating the cutter mandrel with its inner end in alignment with said die plate surface and locating the stripper sleeve with its inner end spaced from said surface a distance equal to the desired axial length of rings to be sheared, and means for moving said stripper sleeve axially for clearing the shear bush of the sheared ring.

3. A ring shearing machine comprising in combination a die plate having a stock feeding aperture and a knock-out aperture, a stock mandrel within the stock feeding aperture adapted to ride within tubular stock fed through said stock feeding aperture, a knock-out aperture, a shear bush slideable along the surface of the die plate having a bore corresponding to the stock feeding aperture to receive stock to be sheared off for forming a ring, a cutter mandrel concentrically carried within said shear bush bore, means for locating the cutter mandrel with its inner end in alignment with said die surfaces, said stock mandrel being shorter than the stock and having an inner end portion of a diameter to snugly fit within the stock whereby motion of said stock into said shear-bush bore urges said stock mandrel against said cutter mandrel, means in alignment with the knock-out aperture for driving the sheared ring into said knock-out aperture for clearing the shear bush thereof, and means for moving said knock-out device for ejecting the sheared ring from said knock-out aperture through said die surface.

4. In a ring shearing machine, a cut off quill having a stock feeding aperture, a shear member having a shearing edge slideable across the end of said quill, an abutment member movable with said shear member during the shearing operation thereof and positioned to fit within a length of tubular stock projecting past said shearing edge, means holding said abutment member with its end in the plane of said shearing edge, and a mandrel within the stock feeding aperture of said quill adapted to fit within tubular stock fed through said quill, said mandrel being shorter than the stock and having a portion of a diameter snugly fitting within the stock with sufficient friction so that feeding motion of said stock through said quill presses the end of said mandrel into engagement with said abutment, said portion being less than one diameter in axial length, said mandrel having another portion of smaller diameter and of substantially greater length to hold said mandrel in axial alignment with the stock, said last-mentioned portion being spaced axially from said first portion and joined thereto by a tapering portion.

JOHN H. FRIEDMAN.

REFERENCES CITED

The following references are of record in the file of this patent:

UNITED STATES PATENTS

| Number | Name | Date |
|---|---|---|
| 771,752 | Stafford | Oct. 4, 1904 |
| 1,955,195 | Lothrop et al. | Apr. 17, 1934 |
| 2,029,797 | Sautier | Feb. 4, 1936 |
| 2,412,930 | Walklet | Dec. 17, 1946 |
| 2,428,540 | Babbitt et al. | Oct. 7, 1947 |